United States Patent
Tsai et al.

(10) Patent No.: US 10,783,911 B1
(45) Date of Patent: Sep. 22, 2020

(54) DATA STORAGE DEVICE BANK WRITING SERVO SECTORS FOR INTERLEAVED SERVO CONTROL PROCESSING

(71) Applicant: Western Digital Technologies, Inc., San Jose, CA (US)

(72) Inventors: Chun S. Tsai, Tustin, CA (US); Dean V. Dang, Fountain Valley, CA (US); Thao H. Banh, Lake Forest, CA (US); Colin W. Morgan, Mission Viejo, CA (US); Hien T. Chu, Fountain Valley, CA (US); Alexander Babinski, Laguna Niguel, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/798,682

(22) Filed: Feb. 24, 2020

(51) Int. Cl.
  *G11B 5/09*     (2006.01)
  *G11B 5/596*    (2006.01)
  *G11B 5/55*     (2006.01)

(52) U.S. Cl.
  CPC ........ *G11B 5/59655* (2013.01); *G11B 5/5573* (2013.01)

(58) Field of Classification Search
  None
  See application file for complete search history.

(56) References Cited

U.S. PATENT DOCUMENTS

| | | | |
|---|---|---|---|
| 5,321,564 A * | 6/1994 | Takahashi | G11B 5/59627 360/77.04 |
| 6,018,430 A * | 1/2000 | Ho | G11B 19/28 360/48 |
| 6,483,659 B1 | 11/2002 | Kobayashi et al. | |
| 6,606,216 B1 * | 8/2003 | Liikanen | G11B 5/59683 360/77.08 |
| 6,735,032 B2 | 5/2004 | Dunn et al. | |
| 6,781,780 B1 * | 8/2004 | Codilian | G11B 5/5526 360/53 |
| 6,952,322 B1 * | 10/2005 | Codilian | G11B 5/5582 360/75 |
| 7,133,233 B1 | 11/2006 | Ray et al. | |
| 7,505,223 B1 | 3/2009 | McCornack | |
| 8,537,486 B2 | 9/2013 | Liang et al. | |
| 9,129,630 B1 | 9/2015 | Guo et al. | |
| 9,361,919 B1 | 6/2016 | Lieu et al. | |
| 9,792,938 B1 | 10/2017 | Kobayashi et al. | |
| 10,665,257 B2 | 5/2020 | Schmidt et al. | |
| 2003/0179482 A1 * | 9/2003 | Fukushima | G11B 5/59633 360/48 |

* cited by examiner

*Primary Examiner* — Peter Vincent Agustin (57) ABSTRACT

A data storage device is disclosed comprising a first head actuated over a first disk surface, and a second head actuated over a second disk surface. During a first revolution of the disk surfaces, a first set of servo sectors are written to the first disk surface and a second set of servo sectors are written to the second disk surface, wherein the first set of servo sectors are circumferentially offset from the second set of servo sectors. During a second revolution of the disk surfaces, at least one of the servo sectors in the first set is read from the first disk surface and at least one of the servo sectors in the second set is read from the second disk surface to control a position of the first head over the first disk surface.

20 Claims, 9 Drawing Sheets

DATA STORAGE DEVICE BANK WRITING SERVO SECTORS FOR INTERLEAVED SERVO CONTROL PROCESSING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
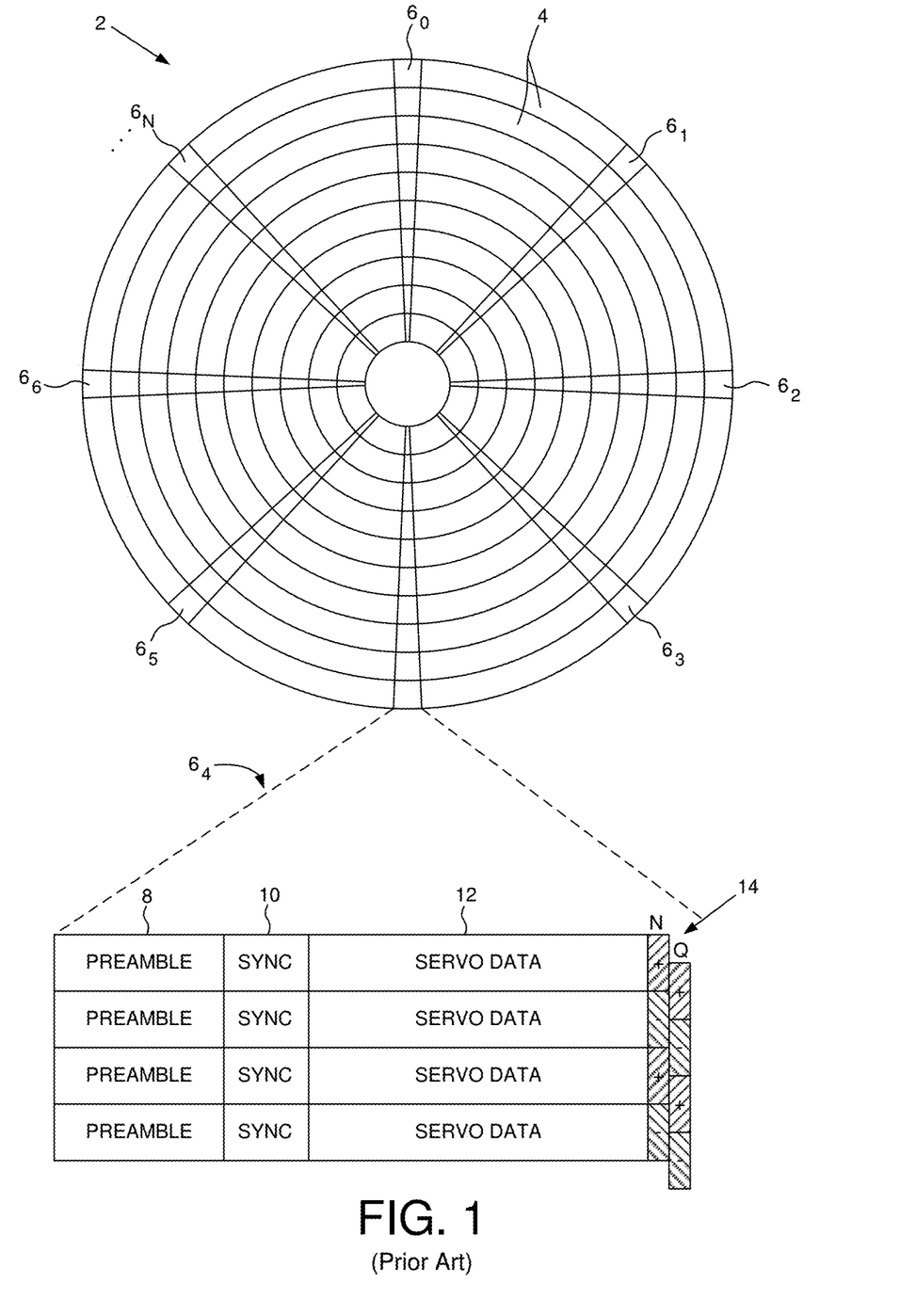
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
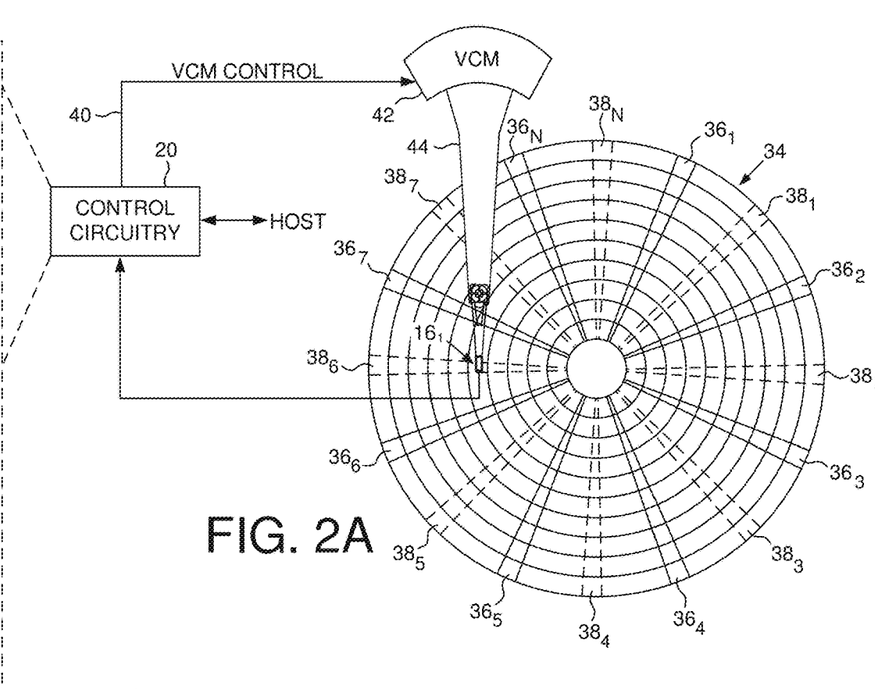
FIGS. 2A and 2B show a data storage device in the form of a disk drive according to an embodiment comprising a first head actuated over a first disk surface and a second head actuated over a second disk surface.
Figure 2B:
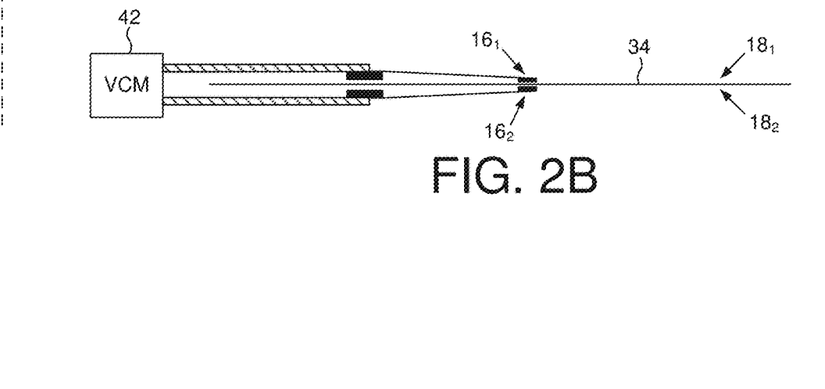
Figure 2C:
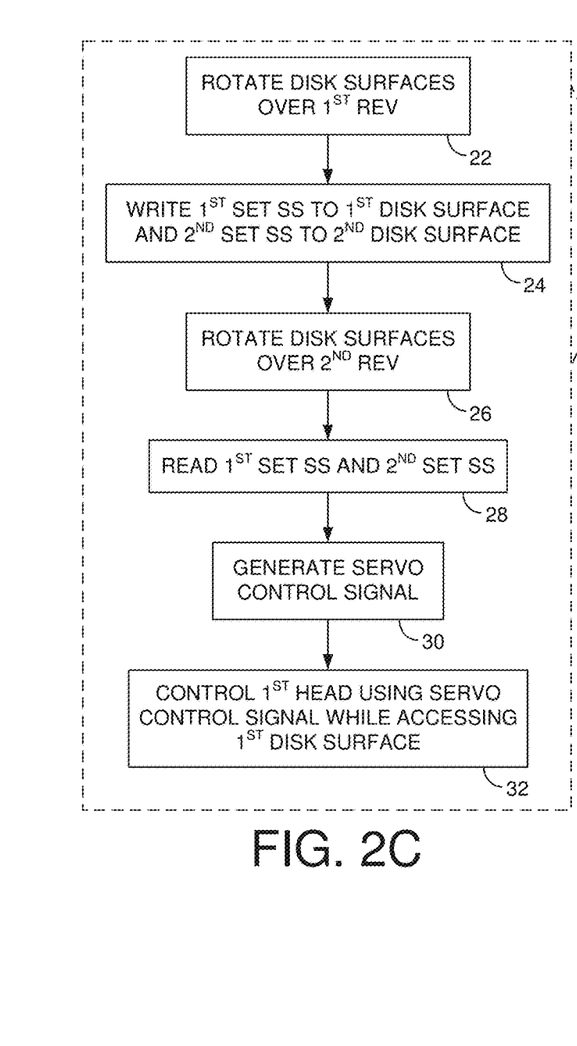
FIG. 2C is a flow diagram according to an embodiment wherein during a first revolution of the disk surfaces a first set of servo sectors are written to the first disk surface and a second set of servo sectors are written to the second disk surface, wherein the first set of servo sectors are circumferentially offset from the second set of servo sectors.

FIGS. 2A and 2B show a data storage device in the form of a disk drive according to an embodiment comprising a first head $16_1$ actuated over a first disk surface $18_1$, and a second head $16_2$ actuated over a second disk surface $18_2$. The disk drive further comprises control circuitry 20 configured to execute the flow diagram of FIG. 2C wherein while rotating the first disk surface and the second disk surface over a first revolution (block 22), a first set of servo sectors is written to the first disk surface and a second set of servo sectors is written to the second disk surface, wherein the first set of servo sectors are circumferentially offset from the second set of servo sectors (block 24). While rotating the first disk surface and the second disk surface over a second revolution (block 26), at least one of the servo sectors in the first set is read from the first disk surface to generate a first read signal and at least one of the servo sectors in the second set is read from the second disk surface to generate a second read signal (block 28). A servo control signal is generated based on the first read signal and the second read signal (block 30) which is used to control the position of the first head over the first disk surface in order to access the first disk surface (block 32).

In the embodiment of FIGS. 2A and 2B, the first disk surface $18_1$ is the top surface of a disk 34 and the second disk surface $18_2$ is the bottom surface of the disk 34. The first set of servo sectors $36_1$-$36_N$ are written to the top disk surface $18_1$ and the second set of servo sectors $38_1$-$38_N$ are written to the bottom disk surface $18_2$ circumferentially offset from the first set of servo sectors $36_1$-$36_N$. In the embodiment of FIG. 2A, the second set of servo sectors $38_1$-$38_N$ are circumferentially offset so as to be in the middle of a servo sector interval of the first set of servo sectors $36_1$-$36_N$. As a result, when the servo sectors are read from both the top and bottom surfaces during a revolution of the disk 34, the servo sample interval is effectively doubled relative to the servo sector interval of each disk surface. The control circuitry 20 processes the read signals emanating from the heads to demodulate the servo sectors and generate a position error signal (PES) representing an error between the actual position of the head and a target position relative to a target track. A servo control system in the control circuitry 20 filters the PES using a suitable compensation filter to generate a control signal 40 applied to a VCM 42 which rotates an actuator arm 44 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the first set of servo sectors $36_1$-$36_N$ and the second set of servo sectors $38_1$-$38_N$ are written to the disk surfaces during a servo writing procedure. The servo writing procedure may be executed by an external servo writer wherein the servo written disks are installed into production disk drives, and in another embodiment the servo writing procedure may be executed by the control circuitry 20 of each disk drive (i.e., the servo sectors may be self-servo written). In one embodiment, both the first set of servo sectors $36_1$-$36_N$ and the second set of servo sectors $38_1$-$38_N$ are written during the same revolution of the disk(s) so as to improve the coherency of the servo sectors across the disk surfaces. For example, any external disturbance affecting the disk drive during the servo writing will have essentially the same effect on the first set of servo sectors written to the first disk surface and the second set of servo sectors written to the second disk surface. In one embodiment, the coherency of the servo sectors enables each head to be servoed based on both sets of servo sectors, thereby reducing the number of servo sectors on each disk surface. For example, in the embodiment of FIG. 2A the number of servo sectors on each disk surface may be reduced by half while achieving the same servo sample rate during tracking operations due to the interleave processing of the servo sectors on the top and bottom disk surfaces as illustrated in FIG. 3.

Figure 3:
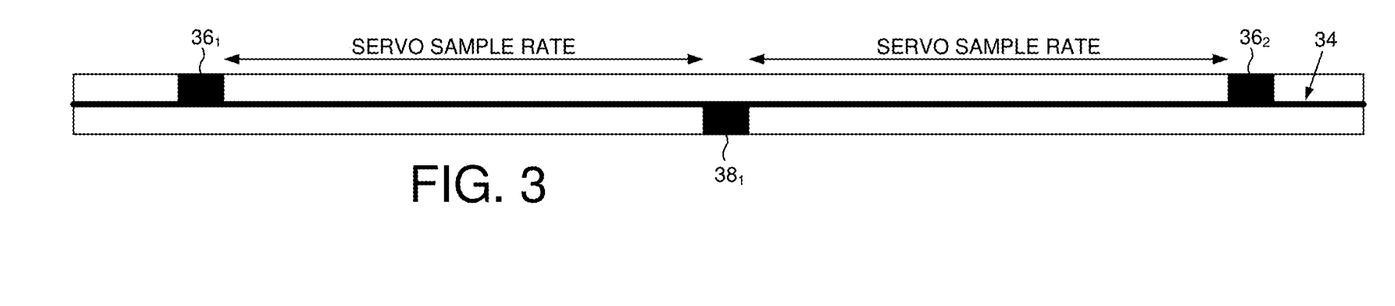
FIG. 3 shows an embodiment wherein the first set of servo sectors are circumferentially offset from the second set of servo sectors by half of a servo sector interval so that the servo sample rate of the combined set of servo sectors is twice the servo sample rate of a single set (a single disk surface).

In one embodiment, the servo sectors shown in FIG. 3 may be written during a single revolution of the disk 34 by alternate writing the servo sectors on the top disk surface and the bottom disk surface. In another embodiment shown in FIG. 4A, during the servo writing process a servo sector may be bank servo written on each disk surface (top and bottom disk surface in FIG. 4A). For example, a servo sector 46 may be written on the top disk surface while concurrently writing servo sector $38_1$ on the bottom disk surface. In embodiments described below, the bank written servo sectors may be used for any suitable purpose, such as to measure a quality of the written servo sectors, to measure PES correction values, to measure repeatable runout (RRO) compensation values, etc. In one embodiment shown in FIG. 4B, the bank written servo sectors (e.g., servo sector 46 in FIG. 4A) may be considered temporary servo sectors that are overwritten with user data, for example, after having validated the quality of the other servo sectors, after measuring PES correction values, or after measuring RRO compensation values.

Figure 4B:
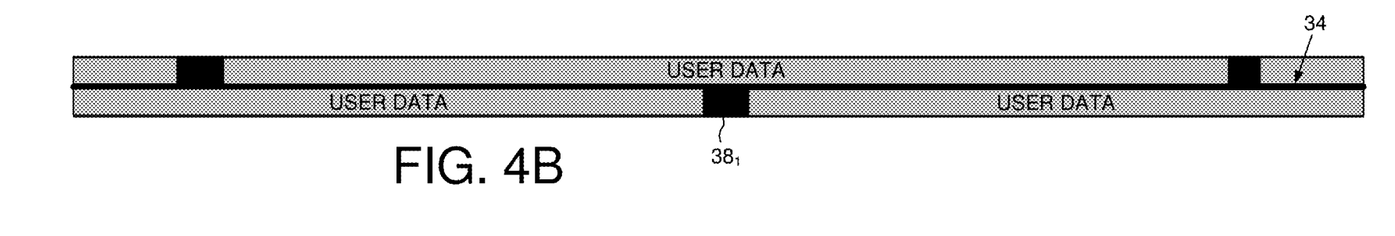
FIG. 4B shows an embodiment wherein the temporary servo sectors are overwritten with user data.
Figure 5A:
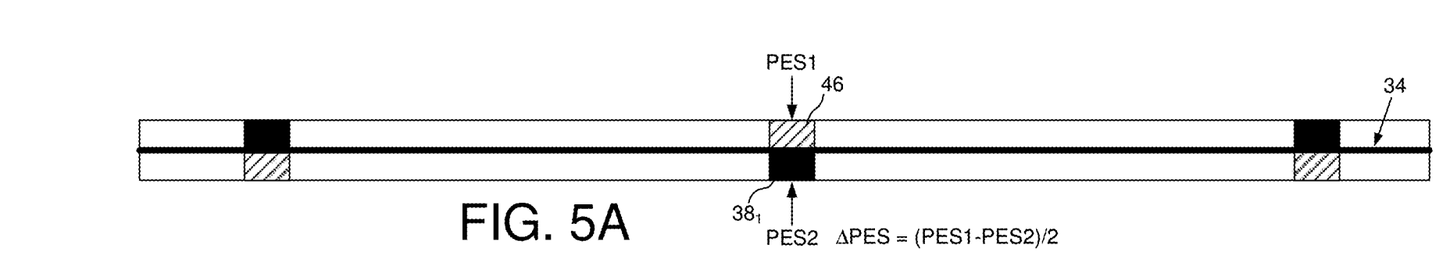
FIG. 5A shows an embodiment wherein the temporary servo sectors are used to generate a delta PES for use in servoing at least the first head over the first disk surface.

FIG. 5A shows an embodiment wherein after bank writing servo sectors on both a top and bottom disk surface, a delta PES is generated for each servo wedge based on the PES generated for the top servo sector and the corresponding PES generated for the bottom servo sector. Ideally the top and bottom servo sectors are fully coherent meaning the PES generated for the top and bottom servo sectors are substantially the same and therefore the delta PES is near zero. Accordingly during an access operation while tracking the centerline of a target data track, the PES generated from either servo sector may be used to generate the control signal applied to an actuator (e.g., the VCM). However, in some cases the delta PES may be significant due, for example, to a defect on the disk when writing the top or bottom servo sector, or due to a transient disturbance affecting either head when writing the top or bottom servo sector. In one embodiment when the delta PES exceeds a predetermined threshold, the delta PES may be stored in a non-volatile memory, such as in a dedicated area of the disk, or in a non-volatile semiconductor memory. In this manner, when the top servo sector 46 in FIG. 5A is overwritten with user data such as shown in FIG. 4B, during an access operation of either disk surface the PES2 generated from reading the bottom servo sector $38_1$ may be adjusted based on the previously measured delta PES, thereby avoiding a transient that might otherwise be injected into the servo system. A similar delta PES may be generated for the bottom servo sectors that are overwritten with user data, that is, the PES1 generated by reading a servo sector from the top disk surface may be adjusted based on the measured delta PES. In the example of FIG. 5A, the delta PES is generated by halving the difference between the PESs, thereby generating the servo PES as a middle value between the top and bottom PES.

Figure 5B:
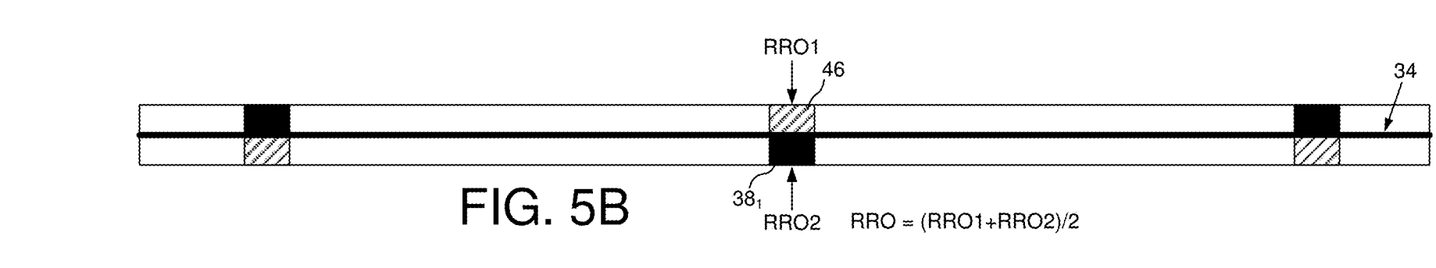
FIG. 5B shows an embodiment wherein the temporary servo sectors are used to generate a repeatable runout (RRO) compensation value.

FIG. 5B shows an embodiment wherein a repeatable runout (RRO) compensation value may be generated for each of the top servo sectors and bottom servo sectors, wherein a composite RRO compensation value may be generated for each servo wedge by averaging the top and bottom RRO compensation values. Any suitable technique may be employed to generate each RRO compensation value based on the PES measured at each servo sector. In an embodiment described below, a feed-forward RRO compensation value may be generated that compensates for low frequency RRO (e.g., due to the sinusoidal disturbance at the rotation frequency of the disk), and a feedback RRO compensation value may be generated that compensates for high frequency RRO (e.g., due to a defect on the disk). In one embodiment, measuring the RRO disturbances based on both the top and bottom servo sectors improves the accuracy of the RRO compensation values. For example in the embodiment wherein the top servo sector 46 is overwritten with user data as in FIG. 4B, the RRO compensation when servoing off the bottom servo sector $38_1$ may be more accurate as compared to measuring the RRO disturbance based only on the bottom servo sector $38_1$.

Generating the PES correction values and/or the RRO compensation values based on top and bottom servo sectors as described above may help improve an embodiment where the top and bottom disk surfaces are accessed concurrently (e.g., concurrent write or read operations). That is when concurrently servoing the top and bottom heads, the coherency of the top and bottom servo tracks may be improved due to the PES correction values and/or the RRO compensation values having been generated based on top and bottom servo sectors.

Figure 5C:
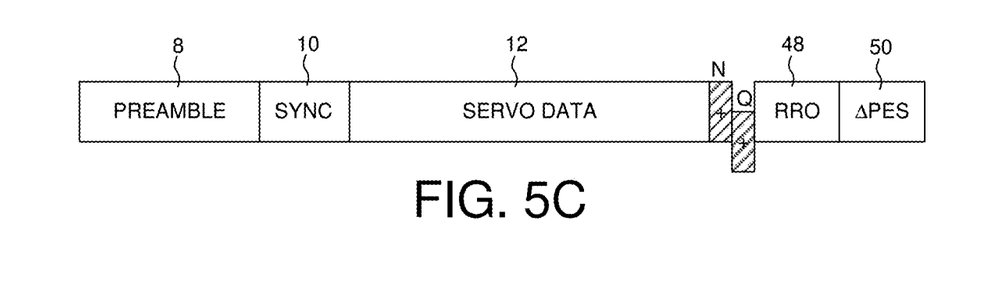
FIG. 5C shows an embodiment wherein the delta PES and/or the RRO compensation value may be stored with each servo sector.

FIG. 5C shows an embodiment wherein the feedback RRO compensation value 48 and/or the PES correction value 50 generated for a servo sector may be written to a field of the servo sector (e.g., at the end of the servo sector). In this manner when the servo sector is read, the corresponding RRO compensation and/or PES correction values are also read and used to adjust the measured PES. In another embodiment, one or both of the feedback RRO compensation values and/or the PES correction values may be stored in a reserved area on the disk or in a non-volatile semiconductor memory and read into a volatile semiconductor memory when the disk drive is powered on. In one embodiment, a PES correction value is generated and stored in a non-volatile memory only for those servo sectors where the measured PES correction value exceeds a threshold. In one embodiment, only a small percentage of servo sectors may have a corresponding PES correction value due to the improved coherency from bank servo writing the top and bottom servo sectors.

Figure 6A:
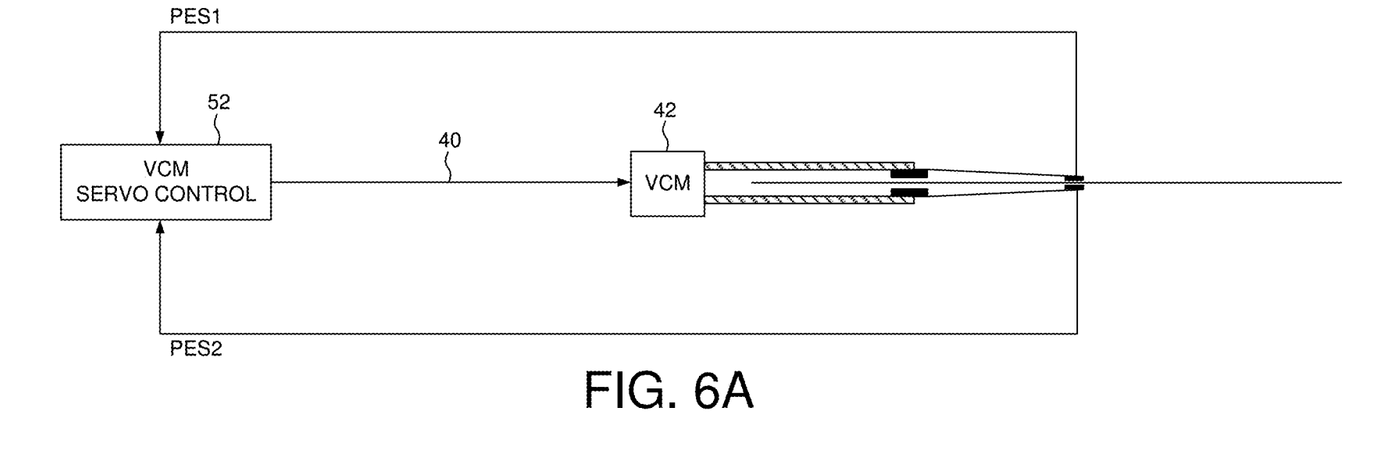
FIG. 6A shows an embodiment wherein the PES generated by each head reading the interleaved servo sectors is used to control a VCM for positioning the heads over the respective disk surfaces.
Figure 6B:
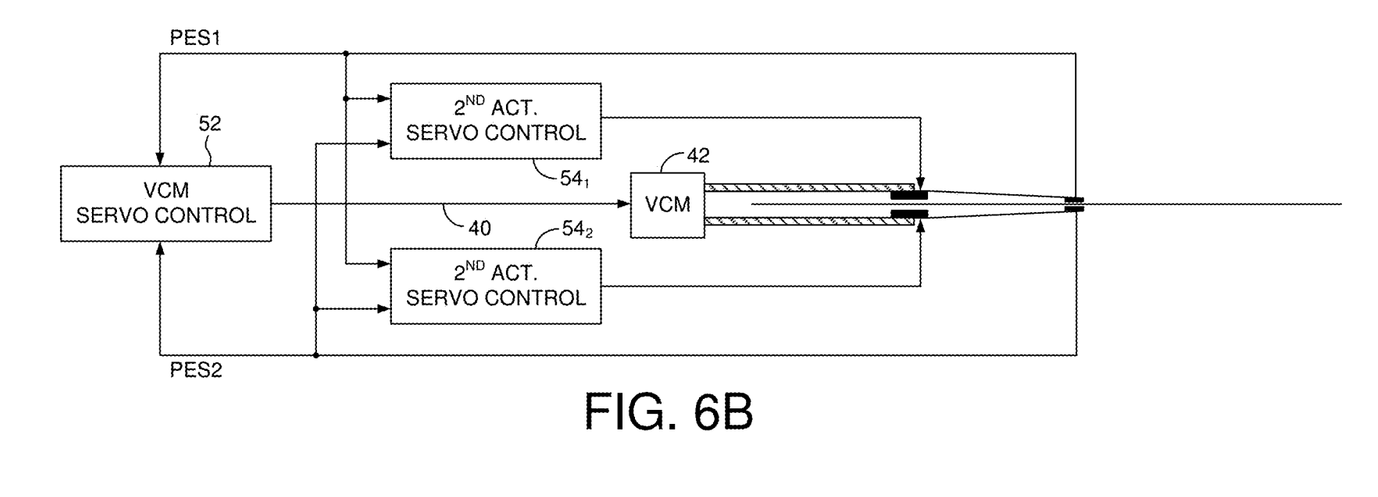
FIG. 6B shows an embodiment wherein the PES generated by each head reading the interleaved servo sectors is used to control a VCM and secondary actuators.

When the servo sectors of two disk surfaces (e.g., top and bottom) are staggered such as shown in the embodiment of FIG. 3 or FIG. 4B, in one embodiment the PES measured from each disk surface may be interleaved processed by the servo control system. FIG. 6A shows an example of this embodiment wherein a VCM servo controller 52 may generate a VCM servo control signal 40 applied to a VCM 42 based on a first PES1 generated from reading a servo sector from the first disk surface (e.g., top disk surface), and based on a second PES2 generated from reading a staggered servo sector from the second disk surface (e.g., bottom disk surface). In another embodiment shown in FIG. 6B, each head may be further controlled using a suitable secondary actuator, such as a secondary actuator configured to actuate a suspension relative to an actuator arm (as shown in FIG. 6B), or a secondary actuator configured to actuate the head relative to the suspension. In this embodiment, each secondary actuator may be controlled by a respective servo controller $54_1$ and $54_2$, wherein each servo controller $54_1$ and $54_2$ may generate an actuator control signal based on the interleave processing of both the first PES1 and the second PES2. In these embodiments, the servo tracks defined by the servo sectors of both disk surfaces are substantially coherent such that the PES generated from either disk surface may be used to servo both heads during an access operation. In one embodiment, the access operation may access one of the disk surfaces while servoing both heads over their respective disk surfaces, and in another embodiment, the access operation may access both disk surfaces concurrently (e.g., concurrent write or read operations).

Figure 7A:
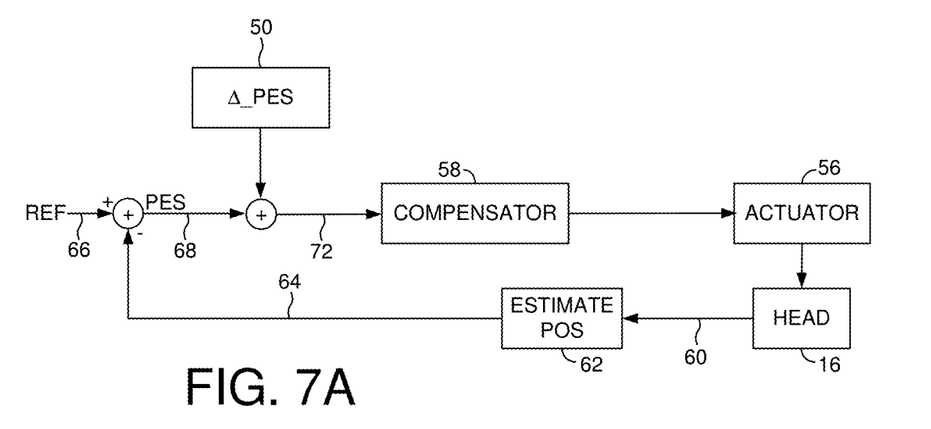
FIG. 7A shows an embodiment wherein a delta PES may be used to adjust the measured PES when reading a servo sector.
Figure 7B:
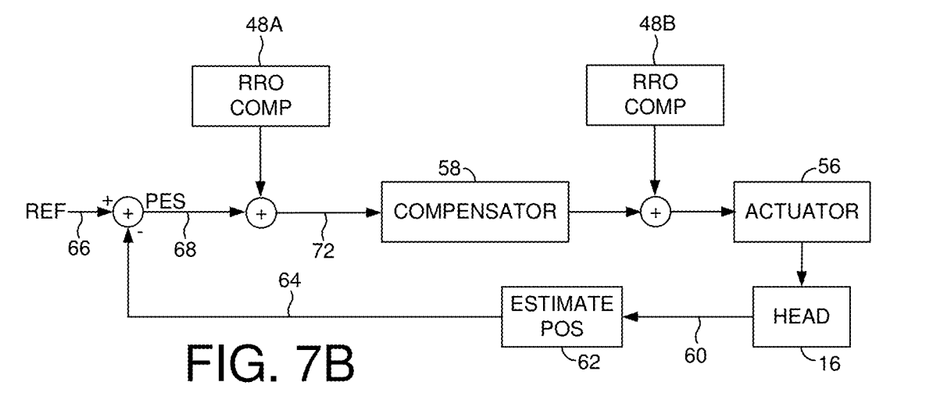
FIG. 7B shows an embodiment wherein an RRO compensation value may be used to compensate for a RRO disturbance.

FIG. 7A shows a closed-loop servo control system according to an embodiment wherein a suitable actuator 56 actuates a head 16 over a disk surface based on a control signal generated by a servo compensator 58. The read signal 60 emanating from the head 16 while reading a servo sector is demodulated 62 into an estimated position 64 that is subtracted from a reference position 66 to generate a measured PES 68. The measured PES is adjusted by a PES correction value 50 described above to generate an adjusted PES 72, wherein the adjusted PES 72 is processed by the servo compensator 58. FIG. 7B shows another embodiment of a closed-loop servo control system wherein the measured PES 68 is adjusted by a feedback RRO compensation value 48A described above, and the output of the servo compensator 58 is adjusted by a feed-forward RRO compensation value 48B described above.

Figure 4A:
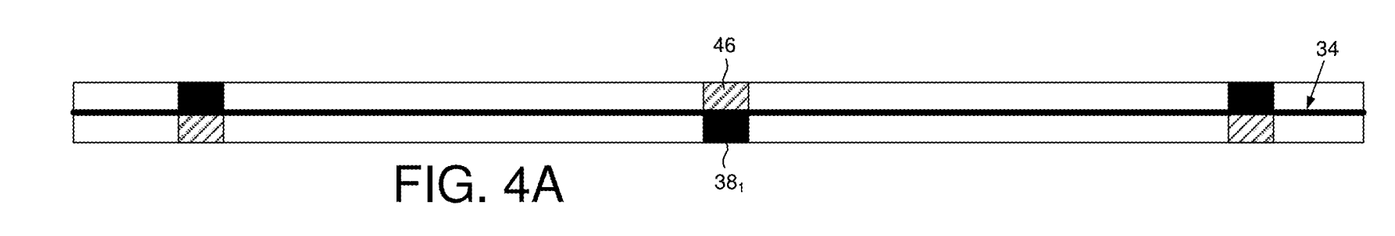
FIG. 4A shows an embodiment wherein temporary servo sectors are bank written to both disk surfaces at each servo sample interval.
Figure 8:
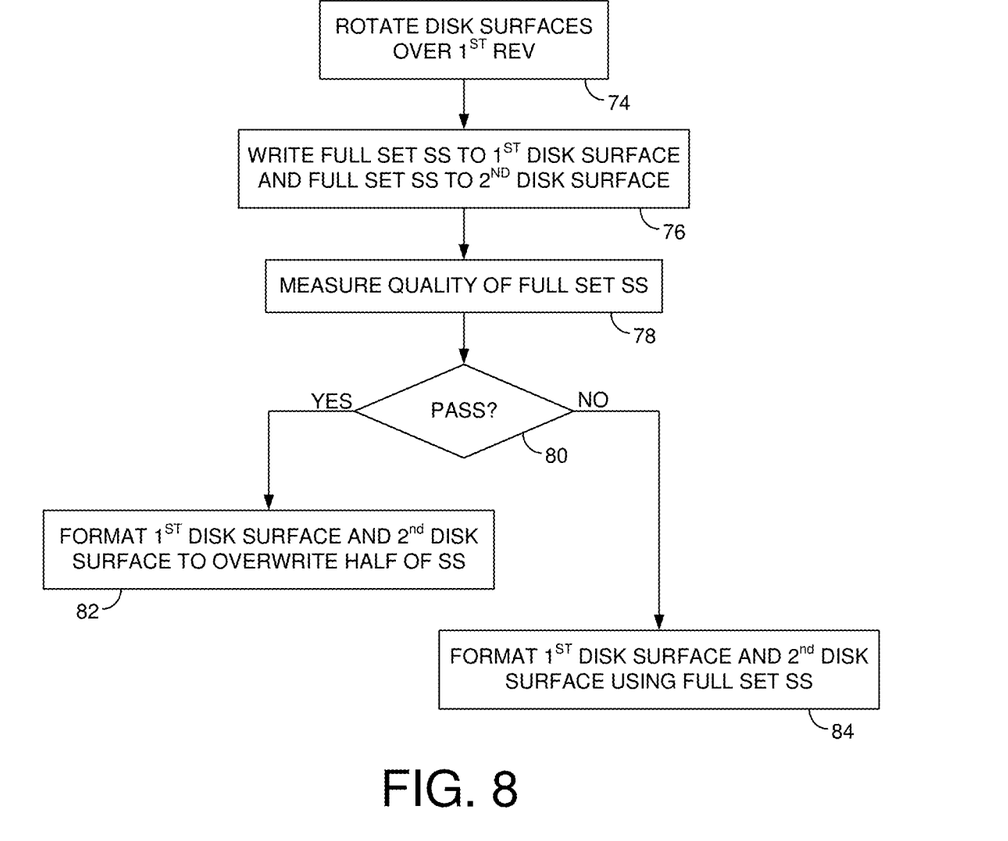
FIG. 8 is a flow diagram according to an embodiment wherein after writing a full set of servo sectors to each of two disk surfaces, a quality of the servo sectors is measured and used to format the disk surfaces with half set servo sectors or full set servo sectors.

FIG. 8 is a flow diagram according to an embodiment wherein while rotating the disk surfaces during a first revolution (block 74), a full set of servo sectors are written to the first and second disk surfaces (block 76) such as shown in FIG. 4A. A quality of the full set of servo sectors is measured (block 78), wherein in one embodiment the servo sector quality is measured for the entire disk surface. If the measured quality of the servo sectors exceeds a threshold (block 80), then each disk surface is formatted to overwrite half of the servo sectors with user data (block 82) such as shown in FIG. 4B. If the measured quality of the servo sectors is less than the threshold at block 80, then each disk surface is formatted using the full set of servo sectors (block 84). In this embodiment, the format efficiency may be optimized to achieve the highest capacity in terms of data tracks per inch and linear bit density relative to the servo sector quality and recording area consumed by the servo sectors. In some instances, a half set of servo sectors recorded in a staggered format such as shown in FIG. 4B provides adequate tracking quality to enable a sufficient recording density while increasing the recording area for user data. In other instances, a full set of servo sectors such as shown in FIG. 4A may improve the format efficiency by enabling a higher recording density even though the recording area for user data is reduced.

Figure 9:
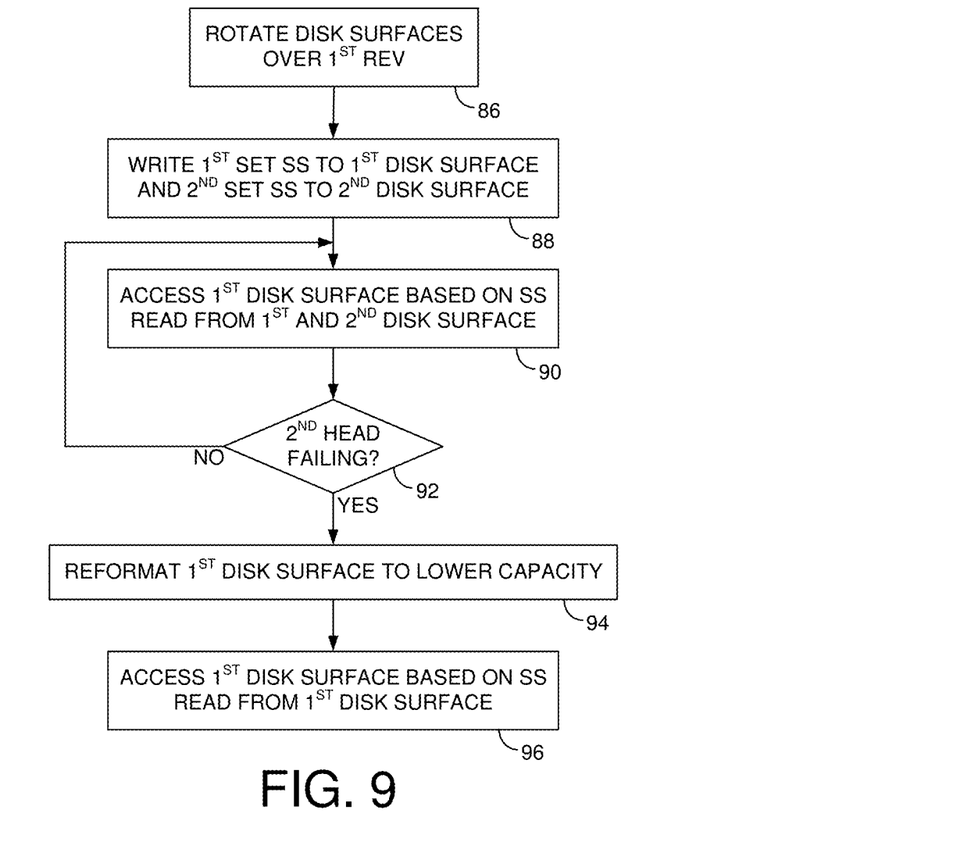
FIG. 9 is a flow diagram according to an embodiment wherein when failure of the second head is predicted, the first disk surface is reformatted to a lower capacity corresponding to a doubling of the servo sample rate.

FIG. 9 is a flow diagram according to an embodiment wherein while rotating the disk surfaces during a first revolution (block 86), a first set of servo sectors are written to the first disk surface and a staggered set of servo sectors are written to a second disk surfaces (block 88) such as shown in FIG. 3 or FIG. 4A. At least the first disk surface is accessed by servoing at least the first head based on reading the servo sectors recorded on the first and second disk surfaces (block 90). During the lifetime of the disk drive, operation of the second head may begin to fail (block 92), such as a read element of the head degrading, or a secondary actuator degrading. When failure of the second head is predicted at block 92, the first disk surface may be reformatted to a lower recording density and corresponding lower capacity by reducing, for example, the data tracks per inch and/or the liner bit density of the data tracks (block 94). That is, the first disk surface may be reformatted so as to be compatible with a reduced servo sample rate due to the servo sectors on the second disk surface becoming unreadable. The first disk surface is then accessed by servoing the first head based on reading the servo sectors from the first disk surface (block 96). In one embodiment, at least some of the user data recorded on the first and/or second disk surfaces may be relocated to a different disk surface in connection with reformatting the first disk surface to facilitate the lower recording density.

Figure 10A:
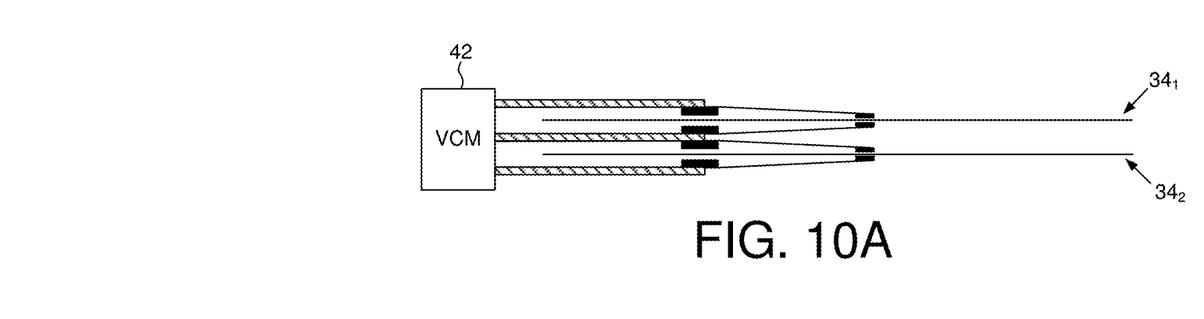
FIG. 10A shows an embodiment wherein the data storage device may comprise two or more disks with heads actuated over respective disk surfaces.
Figure 10B:
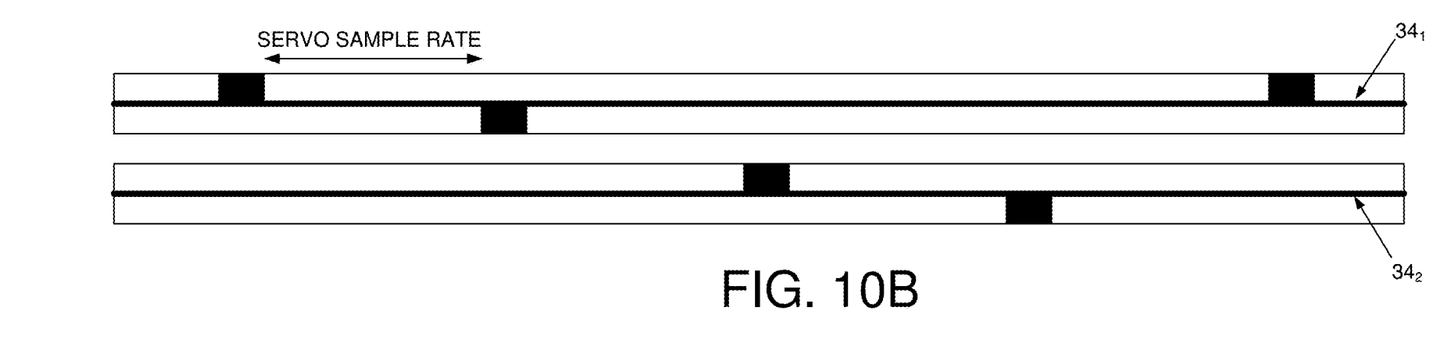
FIG. 10B shows an embodiment wherein servo sectors are written to four disk surfaces in a staggered format.
Figure 10C:
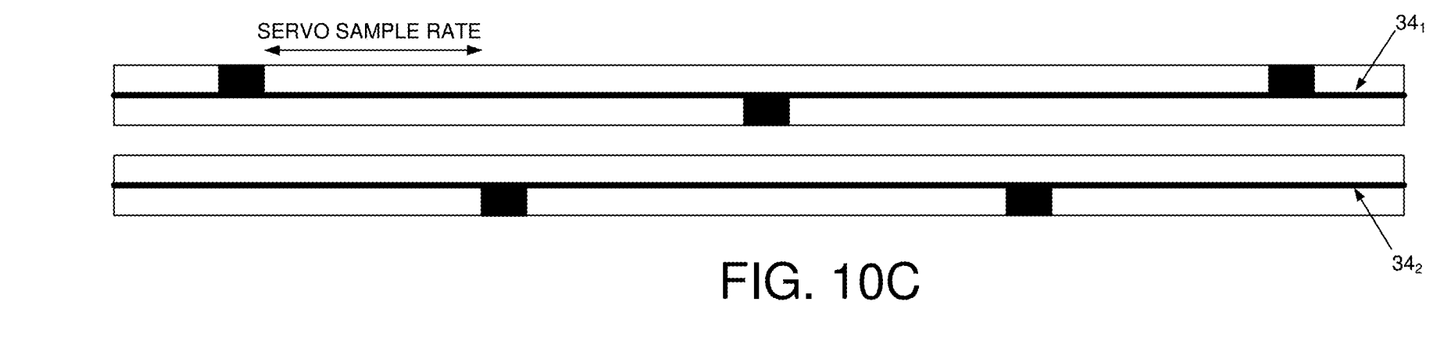
FIG. 10C shows an alternative embodiment wherein servo sectors are written to four disk surfaces in a different staggered format.

In certain embodiments, servo sectors may be written in a staggered format to the top and bottom disk surfaces of a disk such as shown in FIG. 3. In another embodiment shown in FIG. 10A, the disk drive may comprise multiple disks wherein servo sectors may be written in a staggered format to the disk surfaces of different disks. For example, servo sectors may be written to the top disk surface of disk 34$_1$, and corresponding staggered servo sectors may be written to the top or bottom disk surface of disk 34$_2$. In other embodiments, the servo sectors may be written in a staggered format across more than two disk surfaces. For example in the embodiment of FIG. 10A, the servo sectors may be written to the four disk surfaces (e.g., during a single revolution of the disks) in a staggered format wherein the circumferential offset between the servo sectors is one-quarter of the servo sector interval of a single disk surface such as shown in FIG. 10B or FIG. 10C. In this embodiment, the number of servo wedges recorded on each disk surface may be one-fourth of a full set of servo wedges while still achieving the same servo sample rate of a full set of servo wedges.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a first disk surface;
a first head actuated over the first disk surface;
a second disk surface;
a second head actuated over the second disk surface; and
control circuitry configured to:
rotate the first disk surface and the second disk surface over a first revolution;
during the first revolution, write a first set of servo sectors to the first disk surface and write a second set of servo sectors to the second disk surface, wherein the first set of servo sectors are circumferentially offset from the second set of servo sectors;
rotate the first disk surface and the second disk surface over a second revolution;
during the second revolution, read at least one of the servo sectors in the first set from the first disk surface to generate a first read signal and read at least one of the servo sectors in the second set from the second disk surface to generate a second read signal;
generate a servo control signal based on the first read signal and the second read signal; and
control the position of the first head over the first disk surface based on the servo control signal in order to access the first disk surface.

2. The data storage device as recited in claim 1, wherein during the first revolution the control circuitry is further configured to write a third set of servo sectors to the first disk surface, wherein the third set of servo sectors are circumferentially aligned with the second set of servo sectors.

3. The data storage device as recited in claim 2, wherein the control circuitry is further configured to:
generate a first position error signal (PES) by reading a first one of servo sectors out of the second set;
generate a second PES by reading a second one of the servo sectors out of the third set, wherein the second one of the servo sectors is circumferentially aligned with the first one of the servo sectors;
when a difference between the first PES and the second PES exceeds a threshold, save an offset value corresponding to the difference; and
further generate the servo control signal based on the offset value when accessing the first disk surface.

4. The data storage device as recited in claim 2, wherein the control circuitry is further configured to overwrite the third set of servo sectors with user data.

5. The data storage device as recited in claim 1, wherein when accessing the first disk surface the control circuitry is further configured to control the position of the second head over the second disk surface based on the servo control signal.

6. The data storage device as recited in claim 5, further comprising:
   a voice coil motor (VCM) configured to actuate the first head over the first disk surface and the second head over the second disk surface;
   a first secondary actuator configured to actuate the first head over the first disk surface; and
   a second secondary actuator configured to actuate the second head over the second disk surface;
   wherein when accessing the first disk surface the control circuitry is further configured to:
      generate a first servo control signal based on the first read signal and the second read signal;
      control the VCM based on the first servo control signal;
      generate a second servo control signal based on the first read signal and the second read signal; and
      control the first and second secondary actuators based on the second servo control signal.

7. The data storage device as recited in claim 1, wherein the first disk surface is a top surface of a first disk and the second disk surface is a bottom surface of the first disk.

8. A data storage device comprising:
   a first disk surface;
   a first head actuated over the first disk surface;
   a second disk surface;
   a second head actuated over the second disk surface; and
   control circuitry configured to:
   rotate the first disk surface and the second disk surface over a first revolution;
      during the first revolution, write a first set of servo sectors to the first disk surface, write a second set of servo sectors to the first disk surface, and write a third set of servo sectors to the second disk surface, wherein the first set of servo sectors are circumferentially offset from the third set of servo sectors, and the second set of servo sectors are circumferentially aligned with the third set of servo sectors; and
      overwrite the second set of servo sectors of the first disk surface with user data.

9. The data storage device as recited in claim 8, wherein the control circuitry is further configured to:
   rotate the first disk surface and the second disk surface over a second revolution;
   during the second revolution, read at least one of the servo sectors in the first set from the first disk surface to generate a first read signal and read at least one of the servo sectors in the third set from the second disk surface to generate a second read signal;
   generate a servo control signal based on the first read signal and the second read signal; and
   control the position of the first head over the first disk surface based on the servo control signal in order to access the first disk surface.

10. The data storage device as recited in claim 9, wherein the control circuitry is further configured to:
   generate a first position error signal (PES) by reading a first one of servo sectors out of the second set;
   generate a second PES by reading a second one of the servo sectors out of the third set, wherein the second one of the servo sectors is circumferentially aligned with the first one of the servo sectors;
   when a difference between the first PES and the second PES exceeds a threshold, save an offset value corresponding to the difference; and
   further generate the servo control signal based on the offset value when accessing the first disk surface.

11. The data storage device as recited in claim 9, wherein when accessing the first disk surface the control circuitry is further configured to control the position of the second head over the second disk surface based on the servo control signal.

12. The data storage device as recited in claim 11, further comprising:
   a voice coil motor (VCM) configured to actuate the first head over the first disk surface and the second head over the second disk surface;
   a first secondary actuator configured to actuate the first head over the first disk surface; and
   a second secondary actuator configured to actuate the second head over the second disk surface;
   wherein when accessing the first disk surface the control circuitry is further configured to:
      generate a first servo control signal based on the first read signal and the second read signal;
      control the VCM based on the first servo control signal;
      generate a second servo control signal based on the first read signal and the second read signal; and
      control the first and second secondary actuators based on the second servo control signal.

13. The data storage device as recited in claim 8, wherein the first disk surface is a top surface of a first disk and the second disk surface is a bottom surface of the first disk.

14. A data storage device comprising:
   a first disk surface;
   a first head actuated over the first disk surface;
   a second disk surface;
   a second head actuated over the second disk surface;
   a means for rotating the first disk surface and the second disk surface over a first revolution;
   during the first revolution, a means for writing a first set of servo sectors to the first disk surface and write a second set of servo sectors to the second disk surface, wherein the first set of servo sectors are circumferentially offset from the second set of servo sectors;
   a means for rotating the first disk surface and the second disk surface over a second revolution;
   during the second revolution, a means for reading at least one of the servo sectors in the first set from the first disk surface to generate a first read signal and read at least one of the servo sectors in the second set from the second disk surface to generate a second read signal;
   a means for generating a servo control signal based on the first read signal and the second read signal; and
   a means for controlling the position of the first head over the first disk surface based on the servo control signal in order to access the first disk surface.

15. The data storage device as recited in claim 14, wherein during the first revolution further comprising a means for writing a third set of servo sectors to the first disk surface, wherein the third set of servo sectors are circumferentially aligned with the second set of servo sectors.

16. The data storage device as recited in claim 15, further comprising:
   a means for generating a first position error signal (PES) by reading a first one of servo sectors out of the second set;
   a means for generating a second PES by reading a second one of the servo sectors out of the third set, wherein the second one of the servo sectors is circumferentially aligned with the first one of the servo sectors; and
   when a difference between the first PES and the second PES exceeds a threshold, a means for saving an offset value corresponding to the difference, wherein the servo control signal is further generated based on the offset value when accessing the first disk surface.

17. The data storage device as recited in claim 15, further comprising a means for overwriting the third set of servo sectors with user data.

18. The data storage device as recited in claim 14, wherein when accessing the first disk surface further comprising a means for positioning the second head over the second disk surface based on the servo control signal.

19. The data storage device as recited in claim 18, further comprising:
   a primary actuator for actuating the first head over the first disk surface and the second head over the second disk surface;
   a first secondary actuator configured to actuate the first head over the first disk surface; and
   a second secondary actuator configured to actuate the second head over the second disk surface;
   a means for generating a first servo control signal based on the first read signal and the second read signal;
   a means for controlling the primary actuator based on the first servo control signal;
   a means for generating a second servo control signal based on the first read signal and the second read signal; and
   a means for controlling the first and second secondary actuators based on the second servo control signal.

20. The data storage device as recited in claim 14, wherein the first disk surface is a top surface of a first disk and the second disk surface is a bottom surface of the first disk.

* * * * *